US009075824B2

(12) United States Patent
Gordo et al.

(10) Patent No.: US 9,075,824 B2
(45) Date of Patent: Jul. 7, 2015

(54) RETRIEVAL SYSTEM AND METHOD LEVERAGING CATEGORY-LEVEL LABELS

(75) Inventors: Albert Gordo, Barcelona (ES); Jose Antonio Rodriguez Serrano, Grenoble (FR); Florent Perronnin, Domene (FR)

(73) Assignee: XEROX CORPORATION, Norwalk, CT (US)

( * ) Notice: Subject to any disclaimer, the term of this patent is extended or adjusted under 35 U.S.C. 154(b) by 506 days.

(21) Appl. No.: 13/458,183

(22) Filed: Apr. 27, 2012

(65) Prior Publication Data

US 2013/0290222 A1 Oct. 31, 2013

(51) Int. Cl.
*G06F 15/18* (2006.01)
*G06F 17/30* (2006.01)
*G06K 9/62* (2006.01)

(52) U.S. Cl.
CPC ........ *G06F 17/30247* (2013.01); *G06K 9/6259* (2013.01); *G06K 9/6247* (2013.01)

(58) Field of Classification Search
None
See application file for complete search history.

(56) References Cited

U.S. PATENT DOCUMENTS

| | | | |
|---|---|---|---|
| 8,676,803 B1 * | 3/2014 | Leung et al. | 707/737 |
| 2003/0021481 A1 | 1/2003 | Kasutani | |
| 2004/0022442 A1 * | 2/2004 | Kim | 382/225 |
| 2007/0005356 A1 | 1/2007 | Perronnin | |
| 2007/0217676 A1 * | 9/2007 | Grauman et al. | 382/170 |
| 2007/0258648 A1 | 11/2007 | Perronnin | |
| 2008/0069456 A1 | 3/2008 | Perronnin | |
| 2008/0240572 A1 | 10/2008 | Hoshii | |
| 2008/0317358 A1 | 12/2008 | Bressan et al. | |
| 2009/0144033 A1 | 6/2009 | Liu et al. | |
| 2010/0040285 A1 | 2/2010 | Csurka et al. | |
| 2010/0092084 A1 | 4/2010 | Perronnin et al. | |
| 2010/0098343 A1 | 4/2010 | Perronnin et al. | |
| 2010/0189354 A1 | 7/2010 | de Campos et al. | |
| 2010/0191743 A1 | 7/2010 | Perronnin et al. | |
| 2010/0226564 A1 | 9/2010 | Marchesotti et al. | |
| 2010/0257202 A1 * | 10/2010 | Szummer et al. | 707/771 |
| 2010/0318477 A1 | 12/2010 | Perronnin et al. | |
| 2011/0026831 A1 | 2/2011 | Perronnin et al. | |
| 2011/0040711 A1 | 2/2011 | Perronnin et al. | |
| 2011/0052063 A1 | 3/2011 | McAuley et al. | |
| 2011/0091105 A1 | 4/2011 | Perronnin | |
| 2011/0191374 A1 * | 8/2011 | Bengio et al. | 706/12 |
| 2014/0029839 A1 * | 1/2014 | Mensink et al. | 382/159 |

OTHER PUBLICATIONS

Bian, W. et al. "Biased Discriminant Euclidean Embedding for Content-Based Image Retrieval". IEEE Transactions on Image Processing, vol. 19, No. 2. Feb. 2010.*

(Continued)

*Primary Examiner* — David Vincent
*Assistant Examiner* — Benjamin Buss
(74) *Attorney, Agent, or Firm* — Fay Sharpe LLP

(57) ABSTRACT

An instance-level retrieval method and system are provided. A representation of a query image is embedded in a multi-dimensional space using a learned projection. The projection is learned using category-labeled training data to optimize a classification rate on the training data. The joint learning of the projection and the classifiers improves the computation of similarity/distance between images by embedding them in a subspace where the similarity computation outputs more accurate results. An input query image can thus be used to retrieve similar instances in a database by computing the comparison measure in the embedding space.

27 Claims, 2 Drawing Sheets

(56) References Cited

OTHER PUBLICATIONS

Bergamo, A. et al. "Picodes: Learning a compact code for novel-category recognition." Advances in Neural Information Processing Systems. pp. 2088-2096. 2011.*
Wu, Z. et al. "Bundling features for large scale partial-duplicate web image search." Computer Vision and Pattern Recognition, 2009. CVPR 2009. IEEE Conference on. IEEE, 2009. DOI: 10.1109/CVPR.2009.5206566.*
Yang, X. et al. "Near-duplicate detection for images and videos." Proceedings of the First ACM workshop on Large-scale multimedia retrieval and mining. ACM, 2009.*
ER, M-J. et al. "High-speed face recognition based on discrete cosine transform and RBF neural networks." Neural Networks, IEEE Transactions on 16.3 (2005): 679-691. DOI: 10.1109/TNN.2005.844909.*
Song, D. et al. "Biologically inspired feature manifold for scene classification." Image Processing, IEEE Transactions on 19.1 (2010): 174-184. DOI: 10.1109/TIP.2009.2032939.*
Perronnin, F. et al. "Large-scale image categorization with explicit data embedding." Computer Vision and Pattern Recognition (CVPR), 2010 IEEE Conference on. IEEE, 2010. DOI: 10.1109/CVPR.2010.5539914.*
Wang, G. "Using the Internet for object image retrieval and object image classification." (2010).*
Blaschko, et al. "Correlational spectral clustering" CVPR, 2008, pp. 1-8.
Bottou, L. "Stochastic learning" Advanced Lectures on Machine Learning, 2003, pp. 153-174.
Charikar. "Similarity estimation techniques from rounding algorithms" ACM STOC, 2002, pp. 380-388.
Chechik, et al. "An online algorithm for large scale image similarity learning", NIPS 2009, pp. 306-314.
Davis, et al. "Information-theoretic metric learning" ICML, 2007, pp. 209-216.
Deng, et al. "Hierarchical semantic indexing for large scale image retrieval" CVPR, 2011, pp. 785-792.
Deng, et al. "Imagenet: A large-scale hierarchical image database" CVPR, 2009, pp. 248-255.
Deselaers, et al. "Visual and semantic similarity in imagenet" CVPR, 2011, pp. 1779-1784.
Gong, et al. "Iterative quantization: A procrustean approach to learning binary codes" CVPR, 2011, pp. 817-824.
Hotelling, H. "Relations between two sets of variates" Biometrika, vol. 28, No. 314, 1936, pp. 321-377.
Indyk, et al. "Approximate nearest neighbors: towards removing the curse of dimensionality", ACM STOC, 1998, pp. 604-613.
Weston, et al. "Large scale image annotation: learning to rank with joint word-image embeddings", ECML, 2010, vol. 81, pp. 21-35.
Jegou, et al. "Hamming embedding and weak geometry consistency for large scale image search", ECCV, 2008, pp. 304-317.
Jegou, et al. "Packing bag-of-features" ICCV, 2009, pp. 2357-2364.
Jegou, et al. "Product quantization for nearest neighbor search", IEEE TPAMI 33, 2011, pp. 117-128.
Joachims, T. "Optimizing search engines using clickthrough data" KDD, 2002, pp. 1-10.
Kulis, et al. "What you saw is not what you get: Domain adaptation using asymmetric kernel transforms" CVPR, 2011, pp. 1785-1792.
Lampert, et al. "Learning to detect unseen object classes by between-class attribute transfer" CVPR, 2009, pp. 951-958.
Nister, et al. "Scalable recognition with a vocabulary tree" CVPR, 2006, pp. 2161-2168.
Oliva, et al. "Modeling the shape of the scene: a holistic representation of the spatial envelope" IJVC, 2001, 42(3), pp. 145-175.
Perd'och, et al. "Efficient representation of local geometry for large scale object retrieval" CVPR, 2009, pp. 9-16.
Perronnin, et al. "Large-scale image retrieval with compressed fisher vectors" CVPR, 2010, pp. 3384-3333.
Raginsky, et al. "Locality-sensitive binary codes from shift-invariant kernels", NIPS, 2009, pp. 1509-1517.
Rastegari, et al. "Scalable object-class retrieval with approximate and top-k ranking" ICCV, 2011, pp. 2659-2666.
Torresani, et al. "Efficient object category recognition using classemes" ECCV, 2010, pp. 776-789.
Wang, et al. "Learning image similarity from Flickr groups using stochastic intersection kernel machines" ICCV, 2009, pp. 428-435.
Wang, et al. "Semi-supervised hashing for large scale search" IEEE Trans. on Patent Analysis and Machine Intelligence, 2012, vol. 34, No. 12, pp. 2393-2406.
Weinberger, et al. "Distance metric learning for large margin nearest neighbor classification" JMLR 10, 2009, pp. 207-244.
Bai, et al. "Supervised Semantic Indexing", 2009, CIKM, pp. 1-5.
Brandt, J. "Transform Coding for Fast Approximate Nearest Neighbor Search in High Dimensions", IEEE, 2010, pp. 1815-1822.
Csurka, et al. "Visual Categorization with Bags of Keypoints", ECCV SLCV, 2004, pp. 1-16.
Douze, et al. "Combining attributes and Fisher vectors for efficient image retrieval", IEEE Conf. on Computer Vision & Pattern Recognition, 2011, pp. 745-752.
Farquhar, et al. "Improving "bag-of-keypoints" image categorization: Generative Models and PDF-Kernels", Technical Report, University of South Hampton, 2005, pp. 1-17.
U.S. Appl. No. 12/960,018, filed Dec. 3, 2010, Gordo, et al.
U.S. Appl. No. 13/351,038, filed Jan. 16, 2012, Serrano.
Gordo, et al. "Asymmetric Distances for Binary Embeddings", CVPR, 2011, pp. 1-8.
Jegou, et al. "Aggregating local descriptors into a compact image representation", CVPR, 2010, pp. 1-8.
Lowe, D. "Distinctive Image Features from Scale-Invariant Keypoints", 2004, Intl. Journal of Computer Vision, 60(2), pp. 91-110.
Perronnin, et al. "Fisher kernels on visual vocabularies for image categorization", CVPR, 2007, pp. 1-8.
Perronnin, et al. "Improving the fisher kernel for large-scale image classification", ECCV 2010, pp. 143-156.
U.S. Appl. No. 12/890,789, filed Sep. 27, 2010, Sanchez, et al.
U.S. Appl. No. 12/859,898, filed Aug. 20, 2010, Perronnin, et al.
Sanchez, et al. "High-dimensional signature compression for large-scale image classification", CVPR 2011, pp. 1665-1672.
Sivic, et al. "Video Google A Text retrieval approach to object matching in videos", ICCV 2003, pp. 1-8.
Weiss, et al. "Spectral Hashing", NIPS, 2008, pp. 1-8.
Weston, et al. "Large scale image annotation: learning to rank with Joint word-image embeddings", ECML, 2010, pp. 1-16.

* cited by examiner though database images themselves are not labeled, category-level labels of training images are leveraged to learn a projection to a low-dimensional space that is well suited for instance-level retrieval.

RETRIEVAL SYSTEM AND METHOD LEVERAGING CATEGORY-LEVEL LABELS

BACKGROUND

The exemplary embodiment relates to the retrieval arts. It finds particular application in connection with image retrieval using an image as the query and where original representations of both the query image and the target images are embedded in a subspace which is particularly suited to retrieving images in the same category as the query image.

Retrieval systems enable selective retrieval of images from a database (for example, a dedicated database, or the Internet, or some other collection of documents). One use of such systems is in query-by-example instance-level image retrieval: given a query image depicting an object/scene/landmark/document, the aim is to retrieve other images of the same object/scene/landmark/document, within a potentially large database.

Typically, the query images and database images are described with fixed-length vectors which aggregate local image statistics (original image representations or "signatures"). As examples, the bag-of-visual-words or the Fisher vector may be used to generate a multi-dimensional vector. See, for example, G. Csurka, C. Dance, L. Fan, J. Willamowski, and C. Bray, "Visual categorization with bags of keypoints," ECCV SLCV, 2004; J. Sivic and A. Zisserman. "Video Google: A text retrieval approach to object matching in videos," ICCV, 2003; and F. Perronnin, J. Sánchez and T. Mensink, "Improving the fisher kernel for large-scale image classification," ECCV 2010. For ease of computation, some form of dimensionality compression is performed. The compression step typically involves an unsupervised dimensionality reduction step, such as Principal Component Analysis (PCA). See, for example, Y. Weiss, A. Torralba and R. Fergus, "Spectral hashing," NIPS, 2008; H. Jégou, M. Douze, C. Schmid and P. Pérez, "Aggregating local descriptors into a compact image representation," CVPR, 2010; and A. Gordo and F. Perronnin, "Asymmetric distances for binary embeddings," CVPR, 2011.

The purpose for such query-by-example systems may be, for example, for duplicate removal, copy detection or image annotation. For such applications, it is desirable to have good retrieval performance, both in terms of precision and recall. It is often the case that the database images are not labeled, or are not labeled with accurate or useful labels. Thus, in many instances, it may not be possible to improve precision and recall measures by creating a hybrid query, which relies on keyword searching as well as an image signature. There remains a need for a system and method which provide improvements in query-by-example retrieval.

INCORPORATION BY REFERENCE

The following references, the disclosures of which are incorporated herein by reference in their entireties, are mentioned:

U.S. application Ser. No. 13/351,038, filed on Jan. 16, 2012, entitled IMAGE SEGMENTATION BASED ON APPROXIMATION OF SEGMENTATION SIMILARITY, by José Antonio Rodriguez Serrano.

U.S. application Ser. No. 12/960,018, filed on Dec. 3, 2010, entitled LARGE-SCALE ASYMMETRIC COMPARISON COMPUTATION FOR BINARY EMBEDDINGS, by Albert Gordo, et al.

BRIEF DESCRIPTION

In accordance with one aspect of the exemplary embodiment, a retrieval method includes providing a projection for embedding an original image representation in an embedding space. The original image representation is based on features extracted from the image. The projection has been learned from category-labeled training data to optimize a classification rate on the training data. For each of plurality of database images, the method includes computing a comparison measure between a query image and the database image, the comparison measure being computed in the embedding space. Respective original image representations of the query image and the database image are embedded in the embedding space with the projection. Provision is made for retrieving at least one of the database images based on the comparison.

In accordance with another aspect of the exemplary embodiment, a retrieval system includes memory which stores a projection matrix for embedding image features in an embedding space, the projection matrix having been learned from category-labeled training data to optimize a classification rate on the training data. Instructions are provided for computing a comparison between a query image and a database image whose respective features are embedded in the embedding space with the projection matrix. A processor in communication with the memory implements the instructions.

In accordance with another aspect of the exemplary embodiment, a method of generating a retrieval system includes providing a feature-based representation and a category label for each of a set of training images. Each of the category labels corresponds to a respective one of a set of categories. The method includes jointly learning a projection and set of classifiers based on the feature-based representations and category labels, the learning optimizing a classification of the training images by the set of classifiers in an embedding space into which the feature-based representations are embedded with the projection, the set of classifiers including a classifier for each of the categories; and storing the projection for embedding a query image and database images into the embedding space.

DETAILED DESCRIPTION

Aspects of the exemplary embodiment relate to a system and method for image retrieval and to a system and method for developing such a system. The exemplary retrieval system facilitates query-by-example instance-level image retrieval.

Figure 1:
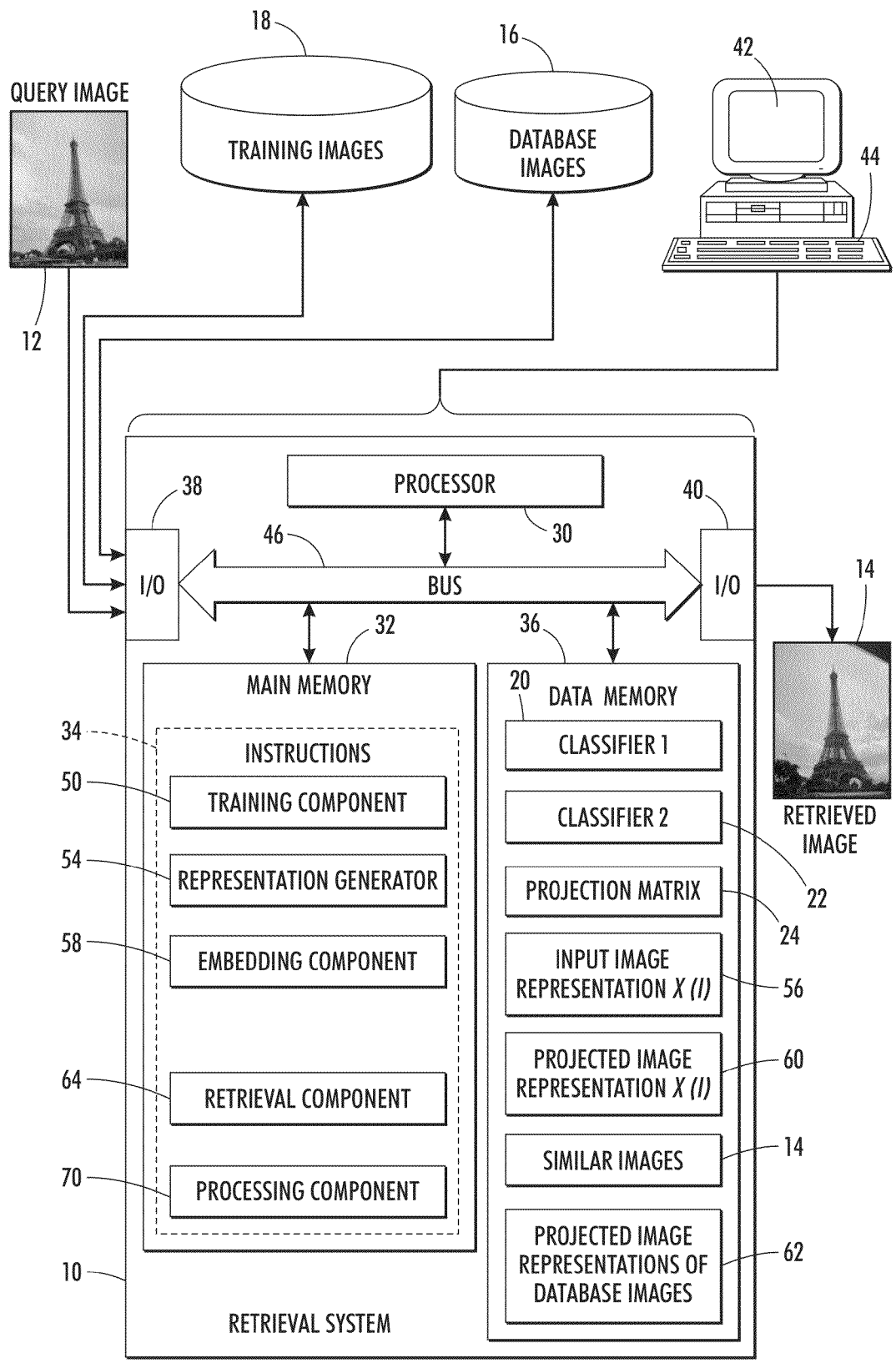
FIG. 1 is a functional block diagram of a retrieval system in accordance with one aspect of the exemplary embodiment.

With reference to FIG. 1, an exemplary retrieval system 10 is illustrated in an operating environment. The system takes as input a query image 12 depicting an item, such as a physical object, scene, landmark, or document. The system 10 then attempts to retrieve other images 14 of the exact same item from an image database 16 which contains a large collection of images. The system 10 is trained using a labeled set of training images 18 which allow dimensionality reduction for the query and database images to be learned in a supervised manner. The use of this labeled data can lead to better projections of the query image 12 and target images 14 that can increase the accuracy for a target compression rate or increase the compression rate for a target accuracy.

Each of the training images 18 is labeled with one (or more) category labels selected from a finite set of category labels, which may have been manually applied to the training images. To improve performance, each training image 18 generally has only a single label. The label may be in the form of a tag, such as an XML tag, or stored in a separate file. Each label corresponds to a respective category from a finite set of categories. There may be a large number of categories such as at least 20, or at least 50, or at least 100 and up to 10,000 or more categories, depending on the application and the availability of training data. For each category, there is a set of images labeled with that category. For example, there may be at least 10 or at least 100, or at least 1000 training images for each category. In general, the database images 16 do not have such labels, although it is contemplated that some or all of the labeled images 18 may form a subset of the database images 18. The category labels for training may be selected according to the particular application of interest. For example, if the aim is to find images of specific buildings, there may be category labels for different types of buildings, such as monuments, towers, houses, civic buildings, bridges, office buildings, and the like. The category labels are thus not so finegrained as to be instance-level labels. In the following, "instance" denotes the occurrence of a particular item (e.g., the Eiffel Tower), while "category" denotes a generic class of objects (e.g., monuments).

The category-level labels are used to jointly learn a set of classifiers 20, 22, one for each category, and a projection 24. Each projection 24 comprises a multidimensional vector, matrix or objective function which, when applied to an original image representation (original signature) 26 in the form of a multidimensional vector, converts the original image representation to a new image representation (referred to herein as an embedded signature or embedded image representation) in a new multidimensional space which is a multidimensional vector of typically fewer dimensions than that of the input signature, a process referred to herein as embedding. In general, the projection can be a matrix and the embedding is the result of multiplying the matrix with the vector 26.

The projection 26 is learned from the category-labeled training data 18 to optimize a classification rate for the classifiers 20, 22, i.e., the probability that the classifier for a category will output a higher score for an image labeled with that category than the other classifiers. Only the learned projection 24 is used for the dimensionality reduction when the system is used for retrieval. Accordingly, the classifiers 20, 22 are subsequently discarded. While the computed projection 24 does not directly optimize the goal of instance retrieval, it can lead to substantial performance improvements. While the exemplary system 10 includes components for learning the projection(s) 24 it is to be appreciated that the learning could be performed by a separate computing device.

The exemplary system 10 provides improvements over a system in which the learning of the projection is cast as a metric learning problem, as exemplified below.

Figure 2:
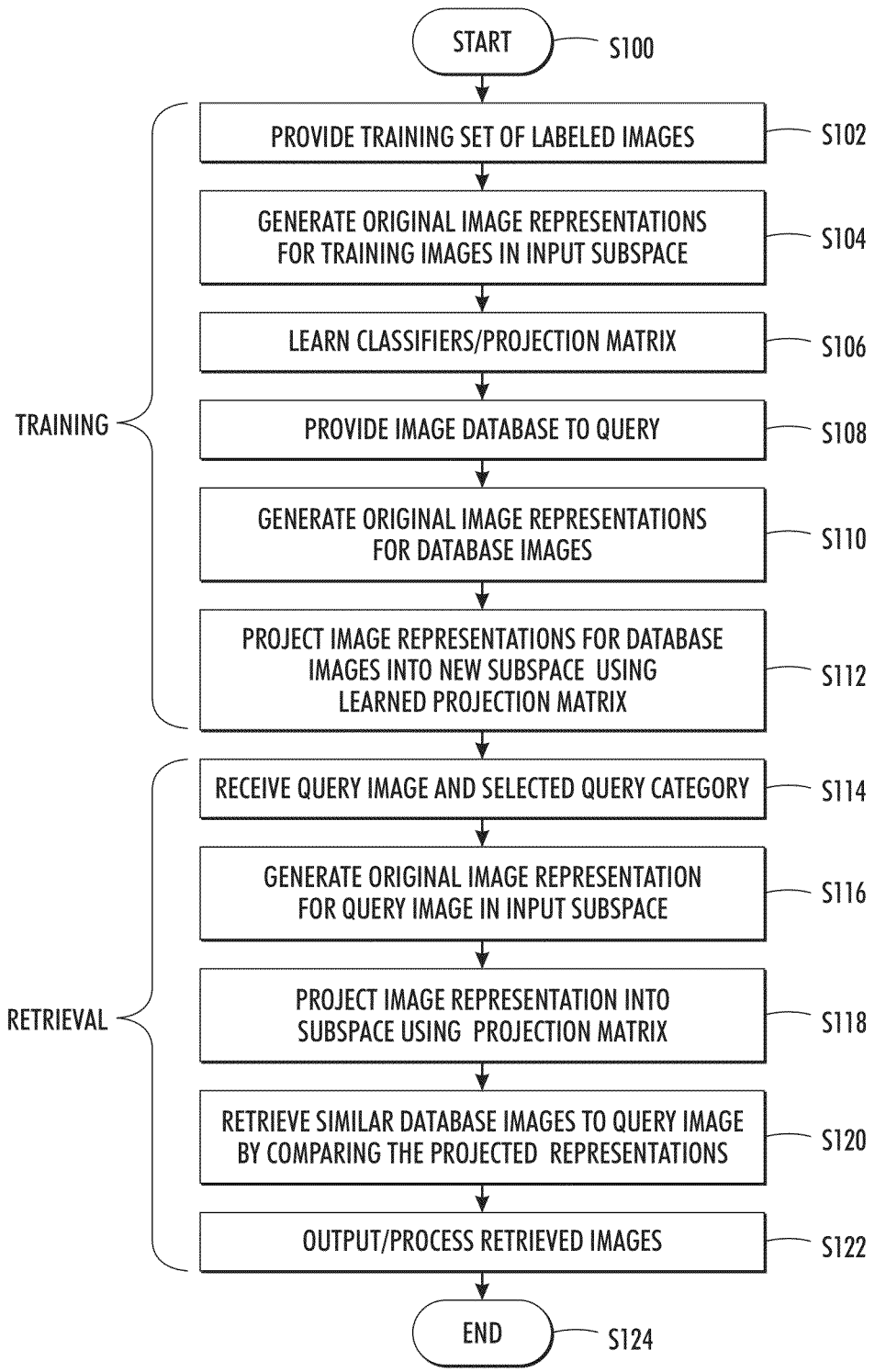
FIG. 2 is a flow diagram illustrating a retrieval method in accordance with another aspect of the exemplary embodiment.

The illustrated system 10 includes a processor 30, which implements at least a part of the method shown in FIG. 2 by execution of software processing instructions 32 which are stored in memory, such as main memory 34, which is communicatively connected to the processor 30. Processor 30 may also control the overall operation of the computer system 10 by execution of instructions stored in main memory 34. Data memory 36, which may be separate from or integral with main memory 34, stores the input image 12 during processing. Computer system 10 also includes one or more input/output interfaces 38, 40 for communicating with external devices and/or external memory, such as remote memory/memories which store(s) the database images 16. The interface 38 is configured for receiving the query image 12 (or a pre-computed original representation 26 thereof) and may include a modem linked to a wired or wireless network, a portable memory receiving component, such as a USB port, disk drive, or the like. The interface 40 may communicate with one or more of a display 42, for displaying information to users, such as images 14, and a user input device 44, such as a keyboard or touch or writable screen, and/or a cursor control device, such as mouse, trackball, or the like, for inputting text and for communicating user input information and command selections to the processor 30. The various hardware components 30, 34, 36, 38, 40, 42 of the system 10 may be all connected by a bus 46. In some embodiments, the display 42 and user input device 44 may form a part of a client computing device which is communicatively linked to the retrieval system computer by a wired or wireless link, such as a local area network or wide area network, such as the Internet.

The exemplary instructions 32 include a training component 50 which jointly learns the projection matrix 24 and classifiers 20, 22. The learning is based on the set of labeled training samples 18, or more particularly based on original image representations (generally, only one per training image) and corresponding category level image labels. The training images 18 (or their image signatures) may be stored in local memory, such as memory 34, 36 or in a remote memory storage device. Once the projection matrix 24 has been learned, the training component 50 can be omitted from the system 10.

A representation generator 54 generates a signature (original image representation) 26, such as a multidimensional vector, for the input image 12, and optionally also for each of the training images 18 and database images 16, if their signatures have not been pre-computed. An embedding component 58 embeds the signatures 26 of the query image 12 and database images 16 into the new subspace, using the learned projection matrix 24 to generate respective projected image signatures 60, 62. A retrieval component 64 compares database images 18 with the query image 12 using a suitable comparison measure for comparing their projected image signatures 60, 62. For example, the retrieval component 64 retrieves one (or more) similar images 14 from the database 16 of images, the similarity (or distance) being computed based on the projection 60 of the original image representation of the input image 12, and projections 62 of the original image representations of the database images into the new multidimensional space. The respective projected image signatures are computed by the embedding component by applying the projection matrix 24 to the original image representations. The similarity/distance computation and embedding may be performed jointly. As will be appreciated, queries may be generated which use additional search criteria, such as a data range, a file size, or the like which may limit the number of images returned in response to the query.

For convenience, pre-computed projections 62 for the database images 16 (generated by applying the learned projection matrix 24 to their image signatures) may be stored in memory 36 for use by the retrieval component 64. A processing component 70 may perform further processing on the retrieved database images and/or output at least a portion of the retrieved database images as responsive to the query, e.g., for display on the display device 42. The outputting of the database image(s) may include outputting the database images themselves, outputting reduced pixel resolution, cropped, or otherwise modified versions of the database images, and/or outputting a locator, such as a URL, where the image can be found. The further processing may include a decision based on the similarity computation, such as marking one or more of the query image and the retrieved database image(s) 14 as a copy, duplicate, or the like. Or it may generate a request for a human review of the query and database images before such a decision is made.

In some embodiments, the retrieved image(s) 14 may be input to a further retrieval method to identify a sub-set of the retrieved images.

The computer system 10 may include one or more computing devices, such as a PC, such as a desktop, a laptop, palmtop computer, portable digital assistant (PDA), a server computer, cellular telephone, tablet computer, pager, combination thereof, or other computing device capable of executing instructions for performing the exemplary method. For example, the retrieval may be performed on a server computer and the results output to a linked client device.

The memory 34, 36 may be separate or combined and may represent any type of non-transitory computer readable medium such as random access memory (RAM), read only memory (ROM), magnetic disk or tape, optical disk, flash memory, or holographic memory. In one embodiment, the memory 34, 36 comprises a combination of random access memory and read only memory. In some embodiments, the processor 30 and memory 34 may be combined in a single chip.

The digital processor 30 can be variously embodied, such as by a single-core processor, a dual-core processor (or more generally by a multiple-core processor), a digital processor and cooperating math coprocessor, a digital controller, or the like. The exemplary digital processor 30, in addition to controlling the operation of the computer system 10, executes the instructions 32 stored in memory 34 for performing the method outlined in FIG. 2.

The term "software," as used herein, is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

FIG. 2 illustrates a retrieval method in accordance with one aspect of the exemplary embodiment which may be performed with the system of FIG. 1. The method includes a training phase, for learning the projection 24, and a retrieval phase, in which the projection is used in instance level retrieval. The method begins at S100.

At S102, training data is provided. This includes a set of training images 18 and their corresponding labels. These may include images with similar visual content to the query image 12, such as images of buildings including monuments in the above example. In the exemplary embodiment, a large collection of images of diverse content is provided as the training set, allowing the system to find application with a wide variety of query images.

At S104, original image signatures 26 are computed for each of the training images 18 (by the representation generator 54), if this has not already been done.

At S106, a projection matrix 24 and classifiers 20, 22 are jointly learned (by the training component 50), based on the set of image signatures 26 and their corresponding category labels for the training data 18. This is described in further detail below. The aim is to find a projection matrix which when applied to the training image signature 26 in the input subspace, embeds the image signature in a new subspace, which enhances the probability that the classifier 20, 22 for the category to which the image belongs, when input with the embedded signature, will output a higher score than for other classifiers. As described below, the learning step may be an iterative process in which the projection matrix and classifiers are updated based on whether the score output by the current classifier on the projected signature, exceeds that of another classifier. However, other machine learning methods are also contemplated. The final projection matrix 24 is stored in memory 36. The classifiers 20, 22 are no longer needed. The result of this step is a learned projection matrix 24 for embedding image representations into a subspace in which instance level retrieval can be performed by computing similarity.

At S108, database images 16 to be queried are provided.

At S110, image signatures 26 for the database images 16 are computed in the input subspace (by the representation generator 54), as for the database images.

At S112, the database images 16 may be embedded into the new subspace using the projection matrix 24 generated at S106. Thus, for each database image, there is a new (projected) image signature.

This ends the training stage, at which point, the training images 18, classifiers 20, 22 and training component 50 are no longer needed.

At S114, a query comprising a query image 12 is received by the system 10. For example, a graphical user interface is generated for display on the display device 42 whereby a user can select an image 12 to be used as the query image. The query image 12 may be selected from a collection of images stored on the user's computing device or from a remotely stored collection, such as database 16. In the exemplary embodiment, the image 12 is not among the images 18 used in training, nor among the images in database 16, although in other embodiments, this situation is not excluded.

At S116, an original image representation 26 is computed for the input query image 12, by the representation generator 54.

At S118, a projected image signature 60 may be computed (by the embedding component 58), by applying the learned projection matrix 24 to the original image signature 26, computed at S116.

At S120, one or more similar images 14 is/are retrieved from the image database 16 (by the retrieval component 68). This step may include computing a comparison measure, such as a similarity (or distance) measure, such as a kernel function, between the projected image signature 60 of the input query image 12 and the projected image signatures 62 of the database images. An exemplary kernel is a linear kernel, such as the dot product, although other similarity measures are also contemplated, such as the L1 distance, chi-squared distance, cosine similarity or the like may be used. The selection of a suitable similarity/distance measure may depend, in part, on the type of signatures used. The choice of similarity measure may also affect the loss function employed in the training step. As previously noted, the projected image signatures 62 of the database images 16 may have been previously computed using the projection matrix 24 and stored in memory 36 at S116. In some embodiments, the embedding (S118) and similarity computation (S120) may be performed in a single step.

In some embodiments, a test may be performed to determine whether the computed similarity between the projected signatures 60 of the image 12 and retrieved image(s) 14 meet(s) a predetermined confidence threshold on the similarity. If not, the method may return no database images 16.

At S122, a portion or all of the retrieved similar images 14 may be output from the system 10, e.g., to the client device, a display device 42, stored in memory, labeled, and/or otherwise processed. For example, a decision may be output by the processing component 70 concerning whether the query image constitutes a duplicate, a copy, or the like.

The method ends at S124.

The method illustrated in FIG. 2 may be implemented in a non-transitory computer program product that may be executed on a computer. The computer program product may comprise a non-transitory computer-readable recording medium on which a control program is recorded (stored), such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart shown in FIG. 2, can be used to implement the retrieval method.

Various aspects of the system and method will now be described.

Computing Original Image Representations (S104, S110, S116)

Various methods are available for computing image signatures. In general, the representation generator 54 generates a statistical representation 26 of low level features extracted from the image, such as visual features or, in the case of text images, features based on word frequencies can be employed.

Exemplary methods for generating original image representations 26 (image signatures) are described, for example, in U.S. Pub. Nos. 20030021481; 2007005356; 20070258648; 20080069456; 20080240572; 20080317358; 20090144033; 20100040285; 20100092084; 20100098343; 20100226564; 20100191743; 20100189354; 20100318477; 20110040711; 20110026831; 20110052063; and 20110091105, the disclosures of which are incorporated herein by reference in their entireties.

For example, the original image representation 26 generated by the representation generator 54 for each image 12, 16, 18 can be any suitable high level statistical representation of the image, such as a multidimensional vector generated based on features extracted from the image. Fisher Kernel representations and Bag-of-Visual-Word representations are exemplary of suitable high-level statistical representations which can be used herein as an original image representation 26. The exemplary original image representations 26 are of a fixed dimensionality, i.e., each original image representation 26 has the same number of elements and in general, has not undergone any automatic dimensionality reduction, such as Principal Component Analysis (PCA).

For example, the representation generator 54 includes a patch extractor, which extracts and analyzes low level visual features of patches of the image, such as shape, texture, or color features, or the like. The patches can be obtained by image segmentation, by applying specific interest point detectors, by considering a regular grid, or simply by the random sampling of image patches. In the exemplary embodiment, the patches are extracted on a regular grid, optionally at multiple scales, over the entire image, or at least a part or a majority of the image.

The extracted low level features (in the form of a local descriptor, such as a vector or histogram) from each patch can be concatenated and optionally reduced in dimensionality, to form a features vector which serves as the global image signature. In other approaches, the local descriptors of the patches of an image are assigned to clusters. For example, a visual vocabulary is previously obtained by clustering local descriptors extracted from training images, using for instance K-means clustering analysis. Each patch vector is then assigned to a nearest cluster and a histogram of the assignments can be generated. In other approaches, a probabilistic framework is employed. For example, it is assumed that there exists an underlying generative model, such as a Gaussian Mixture Model (GMM), from which all the local descriptors are emitted. Each patch can thus be characterized by a vector of weights, one weight for each of the Gaussian functions forming the mixture model. In this case, the visual vocabulary can be estimated using the Expectation-Maximization (EM) algorithm. In either case, each visual word in the vocabulary corresponds to a grouping of typical low-level features. The visual words may each correspond (approximately) to a mid-level image feature such as a type of visual (rather than digital) object (e.g., ball or sphere, rod or shaft, flower, autumn leaves, etc.), characteristic background (e.g., starlit sky, blue sky, grass field, snow, beach, etc.), or the like. Given an image 12, 16, 18 to be assigned an original signature 26, each extracted local descriptor is assigned to its closest visual word in the previously trained vocabulary or to all visual words in a probabilistic manner in the case of a stochastic model. A histogram is computed by accumulating the occurrences of each visual word. The histogram can serve as the image signature 26 or input to a generative model which outputs an image signature based thereon.

As local descriptors extracted from the patches, SIFT descriptors or other gradient-based feature descriptors, can be used. See, e.g., Lowe, "Distinctive image features from scale-invariant keypoints," IJCV vol. 60 (2004). In one illustrative example employing SIFT features, the features are extracted from 32×32 pixel patches on regular grids (every 16 pixels) at five scales, using 128-dimensional SIFT descriptors. Other suitable local descriptors which can be extracted include simple 96-dimensional color features in which a patch is subdivided into 4×4 sub-regions and in each sub-region the mean and standard deviation are computed for the three channels (R, G and B). These are merely illustrative examples, and additional and/or other features can be used. The number of features in each local descriptor is optionally reduced, e.g., to 64 dimensions, using Principal Component Analysis (PCA). Signatures can be computed for two or more regions of the image and aggregated, e.g., concatenated.

In some illustrative examples, a Fisher vector is computed for the image by modeling the extracted local descriptors of the image using a mixture model to generate a corresponding image vector having vector elements that are indicative of parameters of mixture model components of the mixture model representing the extracted local descriptors of the image. The exemplary mixture model is a Gaussian mixture model (GMM) comprising a set of Gaussian functions (Gaussians) to which weights are assigned in the parameter training. Each Gaussian is represented by its mean vector, and covariance matrix. It can be assumed that the covariance matrices are diagonal. See, e.g., Perronnin, et al., "Fisher kernels on visual vocabularies for image categorization" in CVPR (2007). Methods for computing Fisher vectors are more fully described in application Ser. No. 12/890,789 filed on Sep. 27, 2010, entitled IMAGE CLASSIFICATION EMPLOYING IMAGE VECTORS COMPRESSED USING VECTOR QUANTIZATION, by Jorge Sánchez, et al., application Ser. No. 12/859,898, filed on Aug. 20, 2010, entitled LARGE SCALE IMAGE CLASSIFICATION, by Florent Perronnin, et al., and in Jorge Sánchez, and Thomas Mensink, "Improving the fisher kernel for large-scale image classification," in *Proc. 11th European Conference on Computer Vision (ECCV): Part IV*, pages 143-156 (2010), and in Jorge Sánchez and Florent Perronnin, "High-dimensional signature compression for large-scale image classification," in CVPR 2011, the disclosures of which are incorporated herein by reference in their entireties. The trained GMM is intended to describe the content of any image within a range of interest (for example, any color photograph if the range of interest is color photographs).

In other illustrative examples, a Bag-of-Visual-word (BOV) representation of an image is used as the original image representation 26. In this case, the image is described by a histogram of quantized local features. (See, for example, Csurka 2004, Sivic 2003, U.S. Pub. No. 20080069456, the disclosures of which are incorporated herein by reference in their entireties). More precisely, given an (unordered) set of the local descriptors, such as set of SIFT descriptors or color descriptors extracted from a training or test image, a BOV histogram is computed for the image or regions of the image. These region-level representations can then be concatenated or otherwise aggregated to form an image representation (e.g., one for SIFT features and one for color features). The SIFT and color image representations can be aggregated to form the image signature.

During the training phase, a visual vocabulary, i.e., a set of prototypical features, is first learned by automatically clustering a large number of local descriptors from different images, using for example, K-means. Each patch local descriptor (e.g., a 96 or 64 dimensional vector) is then assigned to a nearest cluster and a histogram of the assignments can be generated. In other approaches, a probabilistic framework is employed. For example, it is assumed that there exists an underlying generative model, such as a Gaussian Mixture Model (GMM), from which all the vectors are emitted. A Gaussian Mixture Model (GMM) can be used to model the distribution of local features, i.e. there is a probabilistic visual vocabulary. Each Gaussian (function) in the GMM can be identified with a visual word and the clustering of the local descriptors can be performed through standard EM learning of the GMM parameters (mean and covariance of each of the Gaussians and weight of each Gaussian (function) in the GMM). The GMM vocabulary provides a principled way to cope with assignment uncertainty as each local feature is assigned with a probability to all visual words. (see, e.g., J. Farquhar, S. Szedmak, H. Meng, and J. Shawe-Taylor, "Improving "bag-of-keypoints" image categorisation," Technical report, University of Southampton, 2005). The number of Gaussians in the GMM can be, for example, at least about 100, e.g., at least 10,000. The number can be up to 100,000 and in one embodiment, is less than 10,000, such as about 2000.

In the exemplary embodiment, the set of local descriptors of a given image is transformed into a fixed-length histogram representation by counting the number of local descriptors assigned to each visual word.

The classifier(s) 20, 22 may be trained with any suitable linear or non-linear training algorithm, such as Sparse Linear Regression (SLR), Sparse Multinomial Logistic Regression (e.g., for a classifier which classifies into more than two classes), random forests (decision trees), standard logistic regression, neural networks, linear support vector machines (SVM), SVM using radial basis function (RBF) kernels, linear discriminant analysis, naïve Bayes, Perceptrons, polynomials, linear regression, or any other suitable machine learning method.

Subspace Learning

In the following, the terms "optimization," "minimization," and similar phraseology are to be broadly construed as one of ordinary skill in the art would understand these terms. For example, these terms are not to be construed as being limited to the absolute global optimum value, absolute global minimum, and so forth. For example, minimization of a function may employ an iterative minimization algorithm that terminates at a stopping criterion before an absolute minimum is reached. It is also contemplated for the optimum or minimum value to be a local optimum or local minimum value.

By way of introduction, a method of subspace learning which relies on computing distances between images in a subspace is first described. The exemplary method, in which classifiers and projections are jointly learned is then described in Section B.

A. Subspace Learning as Metric (Distance) Learning

Let q and d be respectively the D-dimensional vectors (original image representations) representing two different images. Assume that the similarity between q and d is measured as follows:

$$s(q,d)=q'Wd$$

where W is a D×D matrix to be learned and q' represents the transpose of q. Assume that W can be decomposed into W=U'U where U is a low-rank R×D matrix (with R<D) then the similarity can be rewritten as:

$$s(q,d)=q'U'Ud=(Uq)'(Ud)$$

This is a dot-product in a low-dimensional space and learning the projection matrix U is equivalent to learning a subspace in which the dot-product is a good similarity measure.

A natural learning framework is the max-margin ranking framework (See, for example, B. Bai, J. Weston, D. Grangie, R. Collobert, O. Chapelle, K. Weinberger, "Supervised semantic indexing", CIKM, 2009).

Given a triplet (q,d+,d−) where d+ is the D-dimensional vector (original image representation) of an image that is supposed to be relevant to q (such as a first training image in a category which is the same as q's) and d− is the D-dimensional vector (original image representation) of an image (such as a training image) that supposed to be irrelevant (such as a second training image in a category which is not the same as q's), then the method aims to enforce:

$$s(q,d+)>s(q,d-)$$

i.e., the aim is to have the relevant document be closer to d+ than to d−.

This could be achieved by directly minimizing the training error:

$$\Sigma_{(q,d+,d-)} I(s(q,d+) < s(q,d-))$$

where I is the indicator function:

$$I(u) = \begin{cases} 1 & \text{if } u \text{ is true,} \\ 0 & \text{otherwise.} \end{cases}$$

i.e., the number of times the system incorrectly gives a lower similarity between a query image and the supposedly relevant image than between the query image and the supposedly irrelevant image, Another approach is to minimize its convex surrogate:

$$\sum_{(q,d+,d-)} \max\{0, 1 - s(q, d+) + s(q, d-)\}.$$

This is the sum over all triples of the maximum of 1 minus the similarity between a query image and the supposedly relevant image plus the similarity between the query image and the supposedly irrelevant image, or 0, where this value is less than 0.

This can be optimized using stochastic gradient descent by randomly sampling triplets (q, d+, d−) from the training set 18 and updating the projection matrix U as follows:

$$U \leftarrow U + \lambda U(q\Delta' + \Delta q')$$

for each triplet that violates $s(q,d+) > s(q,d-)+p$,
where $\Delta = (d+ - d-)$.

Thus, rather than attempting to optimize over all possible pairs of entries in the database simultaneously, the stochastic gradient descent method takes pairs of entries (q,d+), (q,d−) and determines whether the current projection matrix U ranks them correctly, i.e., in the same ranking order as the similarities, and if not updates the projection matrix.

The threshold parameter p avoids updating the projection matrix unless s(q,d+) is greater than s(q,d−) by at least a threshold amount. The threshold parameter p can have a suitable value, such as 1.

The learning rate λ controls how much U is updated at each iteration. It can be a fixed value or variable, e.g., dependent on the number of iterations, such as a decreasing learning rate. The process may be stopped, for example, after a fixed number of iterations or when a convergence criterion is obeyed. U is not regularized explicitly (e.g., by penalizing the Frobenius norm of U) but implicitly with early stopping.

The projection matrix U is initialized with a set of values. These can be quite arbitrary. For example, the initial values in the matrix are drawn at random from a normalized distribution with a mean of 0, i.e., the values sum to 0. In other embodiments, the initial values are all the same, or are drawn from a projection matrix previously created for another segmentation task.

A first triplet of entries is drawn. The triplet can be drawn at random from the training data, or according to any suitable selection algorithm. The similarities of the two pairs of images is computed as the dot product q'U'Ud, which essentially embeds their vectorial input representations using the current projection matrix and multiplies the two.

The updating of the projection matrix U as a function of $\Delta = (d+ - d-)$, updates the parts of the projection matrix in which the two vectors d+ and d− differ.

As an approximation, for the metric learning approach, the projection U can be computed from a large dataset of images with triplets (q,d+,d−) where d+ belongs to the same category as q and d− belongs to a different category. Although categories represent concepts more general than instances, it would be expected that the intra-category variations would be more and more similar to intra-instance variations as more and more fine-grained categories are considered (specific objects, plants, animals, etc.)

Obviously, two images within the same category may be visually very dissimilar and thus enforcing all pairs of images within the same category to have a higher similarity than all pairs of images belonging to different categories may negatively impact the learning. Therefore, the metric learning of the projection from the category-level data may further employ a measure of visual similarity in the sampling procedure. For example, for each image of each class its K nearest neighbors (K-NN) within the same class are identified. K may be, for example, 10, 50 or more, depending on size of the training dataset. Similarity may be computed based on the original image signatures using any suitable similarity measure, such as those listed above. Triplets (q,d+,d−) are then sampled such that d+ belongs to the same category as q and is within the K-NN of q and d− belongs to a different category. By taking into account category labels and visual similarity, better pairs (q,d+) could be obtained.

For comparison, an unsupervised dimensionality reduction may be learned from the K-NN. For each image, its K nearest neighbors are identified, irrespective of the class. Triplets (q,d+,d−) are sampled such that d+ is in the K-NN of q and d− is not in the K-NN of q. This method does not make use of the labels in such case.

B. Joint Subspace and Classifier Learning (S106)

In the exemplary method, the system 10 employs category-level labels. Instead of optimizing a criterion which is consistent with the end-goal (retrieval) but inconsistent with the training data, a criterion is optimized which is only loosely consistent with the end-goal but consistent with the training data. Thus, the method learns a subspace which maximizes categorization accuracy and uses it for instance-level retrieval.

Surprisingly, such an approach works well in practice. The projection in the learned subspace can cancel noisy nuisance factors which are common to categorization and instance-level retrieval (e.g., the fact that "flat patches" typically carry little information) without making the assumption that two images in the same category have to be closer than two images from different categories (as in distance learning).

Similar notation is used as for the equations in Section A above, except as noted.

Let q be an original representation of an image, such as an input image 12, a database image 16, or a training image 18, and let y be a category. The score on a given classifier can be a function of the projected image representation, i.e., a product of the original image representation and the projection matrix U. For example, let the similarity between q and y (i.e., the score of q on class y) be represented as follows:

$$s(q,y) = (Uq)' w_y \quad (1)$$

where U is a R×D projection matrix which projects q (a D-dimensional vector) into the new low-dimensional space of R dimensions and $w_y$ is the classifier of class y in the low-dimensional space, and ' indicate the transpose.

In general, R<D. For example R≤0.5D, or R≤0.1D, or R≤0.01D, although in some embodiments, R≥D. In general, R is at least 10, such as at least 16 or at least 32, and in some embodiments, is up to about 2000, or up to about 1000. D can be at least 2000, or at least 4000 or more, depending on the signature generation method.

Given a set of triplets (q, y+, y−) where y+ is relevant to q (e.g., q is an original image representation of an image in the training set 18 that is labeled with y+) and y− is irrelevant to q (i.e., y− is any of the possible category labels, other than y+), the learning method seeks to optimize a classification rate on the training data by minimizing the following ranking error:

$$\Sigma_{(q,y+,y-)} I(s(q,y+) < s(q,y-)) \quad (2)$$

where I is 1 if s(q,y+)<s(q,y−) is true, 0 otherwise.

Eqn. (2) can be upper-bounded by an objective function of the form:

$$\Sigma_{(q,y+,y-)} \min\{0, t - s(q,y+) + s(q,y-)\} \quad (3)$$

As will be appreciated, other objective functions may be employed which similarly account for a difference in the ranking. See, for example, J. Weston, S. Bengio and N. Usunier, "Large scale image annotation: learning to rank with joint word-image embeddings," ECML, 2010.

Again, this objective function can be optimized with stochastic gradient descent by iteratively sampling a triplet (q, y+, y−) and updating the classifiers and projection matrix, when the loss is positive, i.e., if (t−s(q,y+)+s(q,y−)) is greater than 0. In the exemplary embodiment, updating is performed only if the loss exceeds at least a threshold positive value t, such as at least 0.1, or at least 1. In some cases, the threshold t can be 1, i.e., updating is performed when 1−s(q,y+)+s(q, y−))>0.

The classifiers may be updated as a function of the embedded image representation, as follows:

$$w_{y+} \leftarrow w_{y+} + \eta U q \quad (4)$$

$$w_{y-} \leftarrow w_{y-} - \eta U q \quad (5)$$

The projection matrix is also updated, as a function of the two classifiers, as follows:

$$U \leftarrow U + \eta (w_{y+} - w_{y-}) q' \quad (6)$$

where η is a learning rate, $w_{y+}$ is the classifier for category y+, and $w_{y-}$ is the classifier for class y− (i.e., each is a vector having the same number of dimensions), and q' is the transpose of q.

The updating changes those values in the projection matrix 24 where the classifiers are performing incorrectly, with respect to q. In some embodiments, only one of the classifiers is updated, rather than both classifiers, such as the classifier $w_{y+}$.

As is the case for metric learning, early stopping can be used for regularization. In other embodiments, a stopping criterion may be based on penalizing a norm of the matrix, such as the Frobenius norm, or other suitable stopping criterion.

The classifiers $w_{y+}$ and $w_{y-}$ are then discarded and are not used in the subsequent similarity computations. The projection matrix U is stored in memory.

The learning rate η controls how much the projection matrix U and classifiers $w_{y+}$ and $w_{y-}$ (or at least one of them) are updated at each iteration. η can be a fixed value or variable, e.g., dependent on the number of iterations, such as a decreasing learning rate. In yet other embodiments, the learning rate can be a function of the computed loss, with a larger update when the loss is greater. In general, η can be between 0 and 1, i.e., greater than 0 and less than 1, such as from 0.0001 to 0.9.

In particular, S106 may proceed with a large number of iterations, e.g., at least one or at least two iterations for each training image. At each iteration, an image representation q for an image from the training set 18 is drawn at random or according to some predefined order or selection algorithm. The category label for the image is identified as y+ and the current classifier $w_{y+}$ for that category is identified. Another category y− from the set of is drawn, e.g., at random or according to some predefined order/algorithm. The current classifier $w_{y-}$ for that category is identified. The image representation q is embedded using the current projection matrix and the embedded image representation is scored with each of the classifiers $w_{y-}$ and $w_{y+}$ using equation (1). In particular, the score can be a dot product of the classifier vector and the projected representation, or a function thereof. If the computed loss for the triplet using Eqn. (3) exceeds a predetermined threshold, for example, classifier $w_{y-}$ generates a higher score (higher ranking) than classifier $w_{y+}$, it is assumed that the current projection matrix and current classifier(s) need to be updated, and so are modified in a way which at least partially reduces the error in the ranking.

It is not necessary for the learning method to consider all possible triplets, i.e., every training image with every possible other category. In general, one or more passes may be performed with the training data. In each pass, each training image is considered in one triplet. In the last iteration in the sequence, the updated projection matrix is stored as the projection matrix 24 to be used in the retrieval process.

In some embodiments, more than one projection is learned. For example, a projection could be learned for each category or for a subset of two or more of the categories. In this embodiment, in the retrieval phase, the user would be asked to select an appropriate category or category subset for the query image so that the appropriate projection could be used.

Sources of Labeled Data

There are several large datasets of category-level labeled data which can be used as the training set 18, such as ImageNet, which contains 12 million images of 17,000 categories organized hierarchically.

Since the goal is to perform instance-level image retrieval, then it would be advantageous to learn U from instance-level data, i.e., the method would sample triplets (q,d+,d−) where (q,d+) correspond to the same instance and (q,d−) correspond to different instances. However, image datasets labeled at the instance level tend to be fairly small and it is difficult to learn the metric learning U correctly from small amounts of data. The exemplary embodiment thus makes use of category level labeled training data, as described in section B above.

Images 12, 16, 18 may be received by the system 10 in any convenient file format, such as JPEG, GIF, JBIG, BMP, TIFF, PDF, or the like or other common file format used for images and which may optionally be converted to another suitable format prior to processing. Input images may be stored in data memory during processing. The images 12, 16, 18 can be input from any suitable image source, such as a workstation, database, memory storage device, such as a disk, or the like. The images may be individual images, such as photographs, video images, or combined images which include photographs along with text, and/or graphics, or the like. In general, each input digital image includes image data for an array of pixels forming the image. The image data may include colorant values, such as grayscale values, for each of a set of color separations, such as L*a*b* or RGB, or be expressed in another other color space in which different colors can be represented. In general, "grayscale" refers to the optical density value of any single color channel, however expressed (L*a*b*, RGB, YCbCr, etc.). The exemplary embodiment is also applicable for black and white (monochrome) images.

Comparison Computation (S120)

Once the projection U has been learned, a comparison measure such as the distance or similarity between two images q and d (query image 12 and database image 16) can be computed, e.g., according to:

$$s(q,d)=q'U'Ud=(Uq)'(Ud)$$

i.e., as a dot product between their projections, which outputs a single value. However, other methods of computing similarity/distance are also contemplated. The images in the database with the highest similarity score s(q,d) (or lowest distance) can then be returned.

Further Processing (S122)

The exemplary method has applications to duplicate removal, copy detection and image annotation.

In the case of duplicate removal, one or more of the similar images retrieved from the database 16 could be removed from the database (or the query image not added to the database). For example, if the similarity exceeds a predetermined threshold, two images are considered to be duplicates and one of them is considered for removal, either automatically, or may be presented to the user for confirmation.

In the case of copy detection, the query image may be considered as a potential copy of the retrieved similar image. Once again, the user may be requested to confirm the finding. This may be used to detect copyright infringement by the displayer of the query image on a website or in a printed publication, for example.

In the case of image annotation, the query image and similar database image(s) may be given the same label(s).

Without intending to limit the scope of the exemplary embodiment, the following examples demonstrate the applicability of the method.

EXAMPLES

Example 1

Two standard benchmark datasets were used as the database images:

1. INRIA Holidays (Holidays) contains 1,491 images of 500 scenes and objects. One image per scene/object is used as query to search within the remaining 1,490 images and accuracy is measured as the Average Precision (AP) averaged over the 500 queries.

2. The University of Kentucky Benchmark (UKB) contains 10,200 images of 2,550 objects. Each image is used in turn as query to search within the 10,200 images and accuracy is measured as 4×recall@4 averaged over the 10,200 queries. Hence, the maximum achievable score is 4.

As a source of labeled training data with category-level labels (to learn the projections in a supervised manner), a standard subset of ImageNet: the ImageNet Large Scale Visual Recognition Challenge 2010 (ILSVRC10) was used. This dataset contains 1,000 classes and consists of 3 sets: training, validation and test sets which contain respectively 1.2M, 50K and 150K images. In this example, only the training set was used.

As original image representations, 4,096-dimensional Fisher Vectors (FV) were computed from local orientation histogram and color descriptors. This involved computing 2,048-dimensional FVs for orientation histogram and color descriptors separately and concatenating those FVs.

Five dimensionality reduction techniques were compared with the present method:

1. Unsupervised dimensionality reduction with PCA.
2. Supervised dimensionality reduction learned from instance-level labels, i.e., the dimensionality reduction is learned on UKB and applied to Holidays and vice-versa. Note that the parameters (such as the learning rate) are tuned to optimize test accuracy which gives an advantage to this method.
3. Supervised dimensionality reduction learned from ILSVRC 2010 category-level labels. To avoid tuning the parameters on the test data, we use UKB as a validation set for Holidays and vice-versa.
4. Supervised dimensionality reduction learned from ILSVRC 2010 category-level labels enhanced with K-NN. Again, to avoid tuning the parameters (including the best value of K) on the test data, UKB was used as a validation set for Holidays and vice-versa.
5. Unsupervised dimensionality reduction learned from ILSVRC 2010 without using the category-level labels but just the K-NN labels.
6. The exemplary method based on the joint classifier and dimensionality reduction learning. ILSVRC 2010 was used to learn the classifiers and the projections. To avoid tuning the parameters on the test data, for the Holidays experiments the parameters were validated on UKB and vice-versa.

The results are shown in Table 1 for Holidays and Table 2 for UKB for different levels of dimensionality reduction (R=16 to 512).

TABLE 1

Subspace learning: Results on Holidays

|  | R = 16 | R = 32 | R = 64 | R = 128 | R = 256 | R = 512 |
|---|---|---|---|---|---|---|
| 1. Unsup (PCA) | 53.1% | 61.3% | 68.0% | 72.3% | 75.0% | 76.8% |
| 2. Sup learned on UKB | 51.7% | 61.7% | 66.8% | 72.0% | 75.4% | 76.9% |
| 3. Sup learned on ILSVRC10 | 36.8% | 52.4% | 62.6% | 68.9% | 75.4% | 78.5% |
| 4. Sup learned on ILSVRC10 + K-NN | 49.6% | 62.0% | 66.6% | 70.4% | 74.6% | 77.8% |
| 5. Unsup learned on ILSVRC10 + K-NN | 49.4% | 60.3% | 64.0% | 70.7% | 76.0% | 77.4% |
| 6. Exemplary method | 56.7% | 64.0% | 72.0% | 75.8% | 78.1% | 78.7% |

TABLE 2

Subspace learning: Results on UKB

|  | R = 16 | R = 32 | R = 64 | R = 128 | R = 256 | R = 512 |
|---|---|---|---|---|---|---|
| 1. Unsup (PCA) | 2.56 | 2.82 | 3.01 | 3.08 | 3.15 | 3.18 |
| 2. Sup learned on UKB | 1.07 | 1.98 | 2.54 | 2.89 | 3.06 | 3.15 |
| 3. Sup learned on ILSVRC10 | 1.83 | 2.32 | 2.69 | 2.92 | 3.09 | 3.16 |
| 4. Sup learned on ILSVRC10 + K-NN | 1.24 | 2.18 | 2.57 | 2.85 | 3.02 | 3.13 |

TABLE 2-continued

Subspace learning: Results on UKB

|  | R = 16 | R = 32 | R = 64 | R = 128 | R = 256 | R = 512 |
|---|---|---|---|---|---|---|
| 5. Unsup learned on ILSVRC10 + K-NN | 0.90 | 2.10 | 2.56 | 2.82 | 3.02 | 3.12 |
| 6. Exemplary method | 2.67 | 2.92 | 3.16 | 3.25 | 3.29 | 3.29 |

The results suggest that supervised learning with instance-level labels does not improve accuracy on Holidays or UKB. It is actually significantly worse than the PCA baseline on UKB. This is likely because the training datasets (UKB for Holidays and Holidays for UKB) are too small. A significantly larger dataset with instance-level labels could provide improvements, but such a dataset was not available.

Supervised learning on category-level labels yields poor results, especially for a small number of dimensions R. Note that there is a small improvement with respect to the PCA baseline on Holidays for a large R (e.g., R=512). The conclusion is that learning the embedding on incorrect data can yield worse results than learning the embedding on the correct data.

Supervised learning with category-level labels enhanced with K-NN yields better results than without using the K-NN information on Holidays but worse results on UKB. In both cases, there is no improvement over the PCA baseline. Unsupervised learning with K-NN performs on par with the PCA baseline on Holidays and significantly worse on UKB.

Distance learning does not yield a significant observable improvement of the accuracy by using it to learn a subspace of low dimensionality.

The exemplary method yields improvements over the other five methods.

Example 2

Large-scale experiments were also performed. 1M images were obtained from ImageNet (different from those of ILSVRC 2010) and used as distractors. For instance, when querying with a Holiday (resp. UKB) image this was done on the combined Holiday (resp. UKB)+1M distractors dataset. Results for Holidays are shown in Table 3 and for UKB in Table 4. Except for the case of a very small number of dimensions (R=16), there is a significant improvement with respect to the unsupervised PCA baseline.

TABLE 3

Subspace learning as joint classifier and dimensionality reduction learning: Results on Holidays + 1M distractors

|  | R = 16 | R = 32 | R = 64 | R = 128 | R = 256 | R = 512 |
|---|---|---|---|---|---|---|
| 1. Baseline PCA | 25.5% | 39.3% | 50.3% | 56.5% | 61.2% | 64.4% |
| 6. Exemplary Method | 26.8% | 48.6% | 58.3% | 63.3% | 64.7% | 66.1% |

TABLE 4

Subspace learning as joint classifier and dimensionality reduction learning: Results on UKB + 1M distractors

|  | R = 16 | R = 32 | R = 64 | R = 128 | R = 256 | R = 512 |
|---|---|---|---|---|---|---|
| 1. Baseline PCA | 2.10 | 2.53 | 2.81 | 2.93 | 3.02 | 3.07 |
| 6. Exemplary Method | 1.98 | 2.76 | 3.07 | 3.19 | 3.17 | 3.23 |

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A retrieval method comprising:
   learning a projection for embedding an original image representation in an embedding space, the original image representation being based on features extracted from the image, the projection being learned from category-labeled training data to optimize a classification rate on the training data, the learning of the projection including, for a plurality of iterations:
   selecting a sample from the training data;
   embedding the sample with a current projection;
   scoring the embedded sample with current first and second classifiers, the first classifier corresponding to a category of the label of the sample, the second classifier corresponding to a different category, selected from a set of categories;
   updated the current projection and at least one of the current first and second classifier for iterations where the second classifier generates a higher score than the first classifier, the updated projection serving as the current projection for a subsequent iteration, each of the updated classifiers serving as the current classifier for the respective category for a subsequent iteration; and
   storing one of the updated projections as the learned projection; and
   with a processor, for each of plurality of database images, computing a comparison measure between a query image and the database image, the comparison measure being computed in the embedding space, respective original image representations of the query image and the database image being embedded in the embedding space with the projection; and
   providing for retrieving at least one of the database images based on the comparison.

2. The method of claim 1, wherein the learning of the projection is performed jointly with learning a respective classifier for each of a set of the categories.

3. The method of claim 1, wherein the learning of the projection includes optimizing an objective function which sums, over a set of samples and categories, a function of a score of the sample on the classifier corresponding to its category and a score of the sample on a classifier not corresponding to its category.

4. The method of claim 3, wherein the learning of the projection includes optimizing the objective function with stochastic gradient descent.

5. The method of claim 1, wherein the classifiers are updated as a function of the embedded sample and a learning rate.

6. The method of claim 1, wherein the classifiers are updated as according to the expressions:

$$w_{y+} \leftarrow w_{y+} + \eta Uq$$

and $$w_{y-} \leftarrow w_{y-} - \eta Uq$$

where $\eta$ represents a learning rate, $Uq$ represents the sample embedded with the projection, $w_{y+}$ represents the first classifier and $w_{y-}$ represents the second classifier.

7. The method of claim 1, wherein the projection is updated as a function of the first and second classifiers and a learning rate.

8. The method of claim 1, wherein the projection is updated according to the expression:

$$U \leftarrow U + \eta(w_{y+} - w_{y-})q'$$

where $\eta$ represents a learning rate, $U$ represents the projection matrix, $q$ is a feature-based representation of the sample, $w_{y+}$ represents the first classifier and $w_{y-}$ represents the second classifier.

9. The method of claim 1, further comprising generating an original representation of the query image based on the extracted features and wherein the computing of the comparison between the query image and the database image comprises embedding the original representation of the query image with the projection matrix.

10. The method of claim 1, wherein the original representation comprises a statistical representation of the extracted features.

11. The method of claim 10, wherein the original representation comprises at least one of a Fisher Vector and a Bag-of-Visual-words representation.

12. The method of claim 1, wherein the original representation is of higher dimensionality than the embedded representation.

13. The method of claim 1, wherein the comparison measure is a distance measure and the computing of the distance measure includes computing a dot product between the query image and the database image embedded in the embedding space.

14. The method of claim 1, wherein the projection comprises a projection matrix.

15. The method of claim 1, further comprising outputting at least one of:
   at least one of the retrieved images, and
   a decision based on at least one of the retrieved images.

16. The method of claim 15, wherein the decision is used for at least one of duplicate removal and copy detection.

17. A computer program product comprising a non-transitory recoding medium storing instructions which when executed by a computer, perform the method of claim 1.

18. A system comprising memory which stores instructions for performing the method of claim 1 and a processor in communication with the memory which implements the instructions.

19. A retrieval method comprising:
   with a processor, learning a projection for embedding an original image representation in an embedding space, the original image representation being based on features extracted from the image, the projection being learned from category-labeled training data to optimize a classification rate on the training data, the learning of the projection including optimizing an objective function of the form:

$$\Sigma_{(q,y+,y-)} \min\{0, t - s(q,y+) + s(q,y-)\}$$

where t represents a predetermined threshold, q represents a sample, s(q,y+) represents a score of the sample on the classifier corresponding to its category and s(q,y-) represents a score of the sample on a classifier not corresponding to its category; and for each of plurality of data base images, computing a comparison measure between a query image and the database image, the comparison measure being computed in the embedding space, respective original image representations of the query image and the database image being embedded in the embedding space with the projection; and
   providing for retrieving at least one of the database images based on the comparison.

20. The method of claim 19, wherein the learning of the projection includes, for a plurality of iterations:
   selecting a sample from the training data;
   embedding the sample with a current projection;
   scoring the embedded sample with current first and second classifiers, the first classifier corresponding to a category of the label of the sample, the second classifier corresponding to a different category, selected from a set of categories; and
   updating the current projection and at least one of the current first and second classifiers for iterations where the second classifier generates a higher score than the first classifier, the updated projection serving as the current projection for a subsequent iteration, each of the updated classifiers serving as the current classifier for the respective category for a subsequent iteration; and
   storing an updated projection as the learned projection.

21. A retrieval system comprising:
   memory which stores:
      a projection matrix for embedding image features in an embedding space, the projection matrix having been learned from category-labeled training data to optimize a classification rate on the training data, including, for a plurality of iterations:
         selecting a sample from the training data;
         embedding the sample with a current projection;
         scoring the embedded sample with current first and second classifiers, the first classifier corresponding to a category of the label of the sample, the second classifier corresponding to a different category, selected from a set of categories;
         updating the current projection and at least one of the current first and second classifiers for iterations where the second classifier generates a higher score than the first classifier, the updated projection serving as the current projection for a subsequent iteration, each of the updated classifiers serving as the current classifier for the respective category for a subsequent iteration; and
         storing an updated projection as the learned projection; and
      instructions for computing a comparison between a query image and a database image whose respective features are embedded in the embedding space with the projection matrix; and
   a processor in communication with the memory which implements the instructions.

22. The system of claim 21, further comprising a database which stores a set of the database images.

23. The system of claim 21, wherein the database image comprises a plurality of database images and the instructions include instructions for identifying fewer than all of the plurality of database images as similar to the query image.

24. The system of claim 23, further comprising an output device for outputting at least one of:
   at least one of the identified similar database images, and
   a decision based on at least one of the identified similar database images.

25. A retrieval method comprising:
   providing a feature-based representation and a category label for each of a set of training images, each of the category labels corresponding to a respective one of a set of categories;
   jointly learning a projection and set of classifiers based on the feature-based representations and category labels, the learning optimizing a classification of the training images by the set of classifiers in an embedding space into which the feature-based representations are embedded with the projection, the set of classifiers including a classifier for each of the categories;
   storing the projection for embedding a query image and database images into the embedding space;
   receiving a query image; and
   without using the learned set of classifiers, retrieving at least one the database images based on a computed comparison measure between the query image and the database images embedded in the embedding space with the learned projection.

26. The method of claim 25, wherein the projection comprises a projection matrix.

27. The method of claim 26, wherein the projection matrix is an R×D projection matrix, where R is a number of dimensions in the embedding space and D is a number of dimensions in each of the feature-based representations and where D is greater than R.

* * * * *